US010436407B2

(12) United States Patent
Marley et al.

(10) Patent No.: US 10,436,407 B2
(45) Date of Patent: Oct. 8, 2019

(54) MODULAR HEADLAMP ASSEMBLY FOR PRODUCING A LIGHT DISTRIBUTION PATTERN

(71) Applicants: Michael P. Marley, Erie, PA (US); Ryan Smith, Lakewood, NY (US); Amir Fallahi, West Bloomfield, MI (US)

(72) Inventors: Michael P. Marley, Erie, PA (US); Ryan Smith, Lakewood, NY (US); Amir Fallahi, West Bloomfield, MI (US)

(73) Assignee: Truck-lite, Co., LLC, Falconer, NY (US)

( * ) Notice: Subject to any disclaimer, the term of this patent is extended or adjusted under 35 U.S.C. 154(b) by 52 days.

(21) Appl. No.: 13/841,899

(22) Filed: Mar. 15, 2013

(65) Prior Publication Data

US 2014/0268850 A1 Sep. 18, 2014
US 2017/0067611 A9 Mar. 9, 2017

Related U.S. Application Data

(63) Continuation-in-part of application No. 13/246,481, filed on Sep. 27, 2011, now Pat. No. 9,518,711.

(51) Int. Cl.

| B60Q 1/00 | (2006.01) |
|---|---|
| F21S 41/19 | (2018.01) |
| F21S 41/30 | (2018.01) |
| F21S 41/33 | (2018.01) |

(Continued)

(52) U.S. Cl.
CPC ............ *F21S 41/30* (2018.01); *B60Q 1/0041* (2013.01); *F21S 41/147* (2018.01); *F21S 41/192* (2018.01);

(Continued)

(58) Field of Classification Search
CPC .. F21S 48/1159; F21S 48/1388; F21S 48/328; F21S 48/1154; F21S 48/115;

(Continued)

(56) References Cited

U.S. PATENT DOCUMENTS 7,040,792 B2  5/2006 Brandenburg et al.
7,070,310 B2  7/2006 Pond et al.

(Continued)

OTHER PUBLICATIONS

MarcoFocal Free Form Lighting, LucidShape Computer Aided Lighting, Jul. 3, 2012.

*Primary Examiner* — Tsion Tumebo
(74) *Attorney, Agent, or Firm* — The Bilicki Law Firm, PC

(57) ABSTRACT

A modular headlamp assembly includes low beam headlamp module for providing illumination in a predetermined light distribution pattern. The low beam headlamp module includes a low beam heat sink and mounting assembly having a low beam heat sink portion with first and second sides. A low beam reflector member is attached to the low beam heat sink and mounting assembly such that the low beam heat sink portion bisects the reflector low beam member into first and second segments. A plurality of LED light sources is supported by the low beam heat sink portion. The reflector assembly and plurality of LED light sources produce a light distribution pattern extending at least 40 degrees in a first horizontal direction and at least 40 degrees in a second horizontal direction, with the light distribution pattern having a sharp horizontal cutoff line parallel to and below a horizon.

21 Claims, 13 Drawing Sheets

(51) Int. Cl.
  *F21S 41/39* (2018.01)
  *F21S 41/43* (2018.01)
  *F21S 41/47* (2018.01)
  *F21S 41/50* (2018.01)
  *F21S 45/10* (2018.01)
  *F21S 45/47* (2018.01)
  *F21S 45/49* (2018.01)
  *F21S 41/147* (2018.01)

(52) U.S. Cl.
  CPC ............. *F21S 41/336* (2018.01); *F21S 41/39* (2018.01); *F21S 41/43* (2018.01); *F21S 41/47* (2018.01); *F21S 41/50* (2018.01); *F21S 45/10* (2018.01); *F21S 45/47* (2018.01); *F21S 45/49* (2018.01)

(58) Field of Classification Search
  CPC ........ F21S 48/13; F21S 48/215; F21S 48/145; F21S 48/1305; F21S 48/1283; F21S 48/1394; F21S 48/23; F21S 48/321; F21S 48/1376; B60R 1/1207; B60Q 1/04; B60Q 1/24
  USPC ....... 362/517, 516, 514, 521, 522, 525, 544, 362/546, 548, 549
  See application file for complete search history.

(56) References Cited

U.S. PATENT DOCUMENTS

| | | | |
|---|---|---|---|
| 7,387,417 B2 * | 6/2008 | Sazuka | B60Q 1/0041 362/544 |
| 7,824,076 B2 | 11/2010 | Koester | |
| 8,177,402 B2 | 5/2012 | Ackermann et al. | |
| 8,403,547 B2 | 3/2013 | Stade et al. | |
| 8,469,565 B2 * | 6/2013 | Yatsuda | 362/522 |
| 8,632,233 B2 | 1/2014 | Kawamura | |
| 8,714,795 B2 * | 5/2014 | Uchida | 362/538 |
| 8,851,723 B2 * | 10/2014 | Peck | F21S 48/1159 362/294 |
| 2004/0085779 A1 | 5/2004 | Pond et al. | |
| 2005/0068787 A1 * | 3/2005 | Ishida | B60Q 1/14 362/538 |
| 2005/0094411 A1 * | 5/2005 | Ishida et al. | 362/538 |
| 2007/0019432 A1 | 1/2007 | Shimada | |
| 2007/0086202 A1 * | 4/2007 | Tsukamoto | F21S 48/1159 362/514 |
| 2009/0097247 A1 * | 4/2009 | Tseng | F21K 9/00 362/241 |
| 2010/0124070 A1 * | 5/2010 | Ochiai | 362/512 |
| 2010/0194276 A1 * | 8/2010 | Okubo | F21V 29/76 315/82 |
| 2011/0032720 A1 | 2/2011 | Chen et al. | |
| 2011/0149584 A1 * | 6/2011 | Stade | B60Q 1/0058 362/512 |
| 2011/0211361 A1 | 9/2011 | Kawamura | |
| 2011/0242816 A1 | 10/2011 | Chowdhury et al. | |
| 2012/0120652 A1 | 5/2012 | Bolander, Jr. et al. | |
| 2012/0140466 A1 * | 6/2012 | Yang | F21K 9/137 362/235 |
| 2012/0195058 A1 * | 8/2012 | Uchida | F21S 48/1154 362/520 |

* cited by examiner

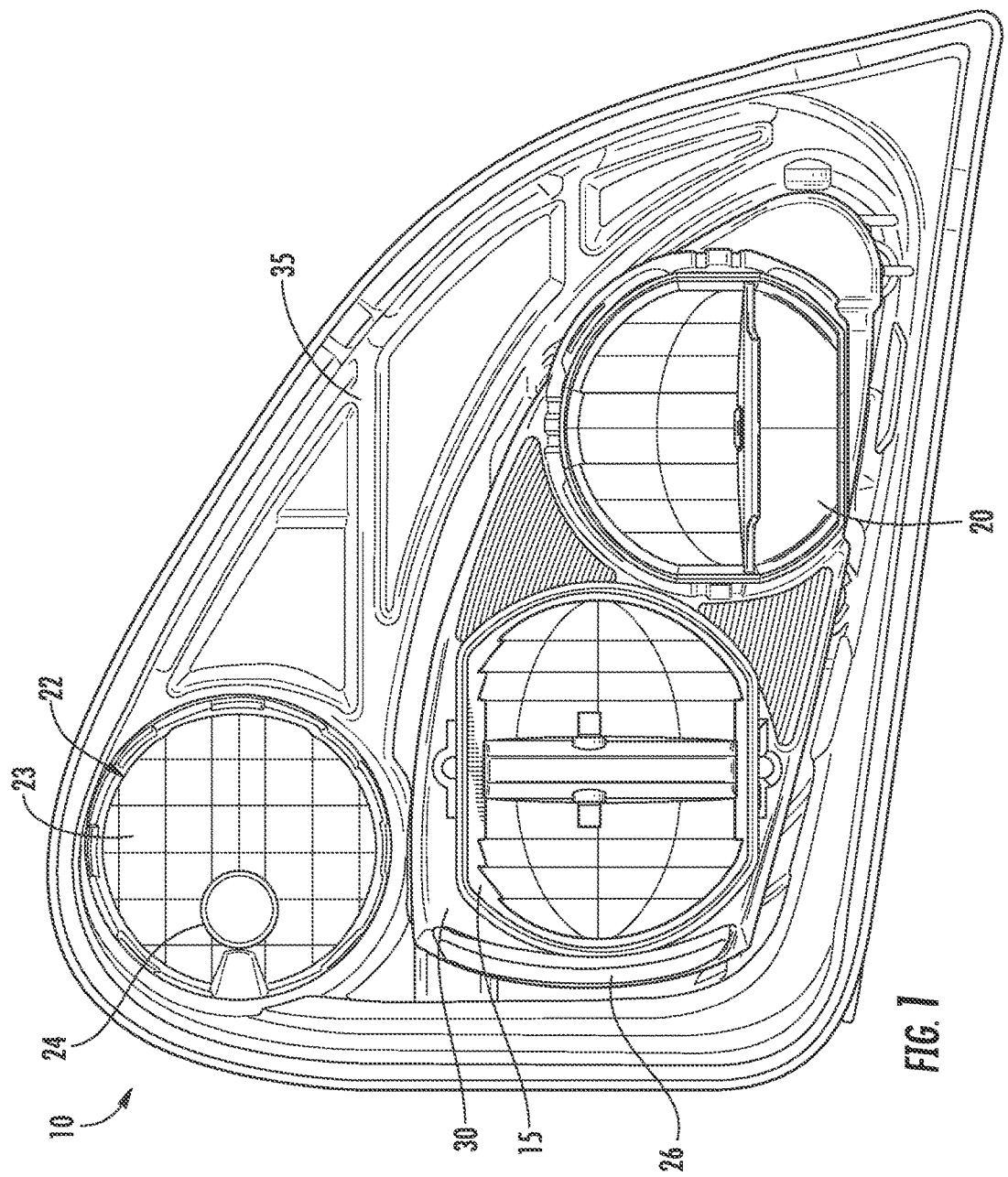

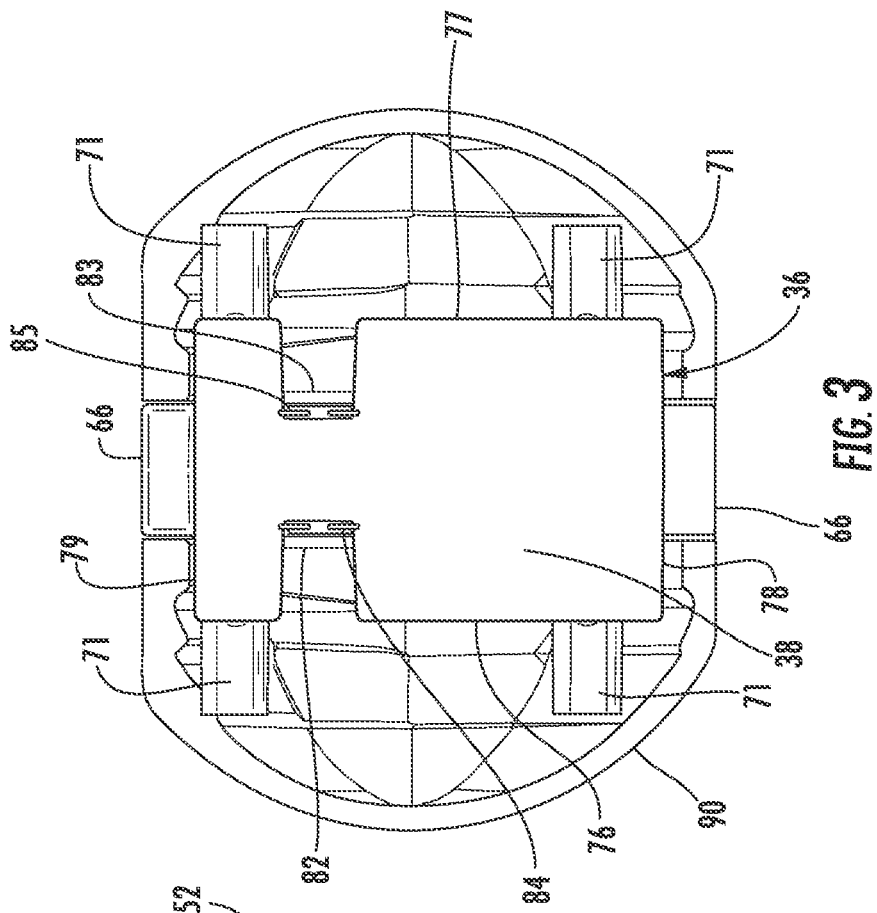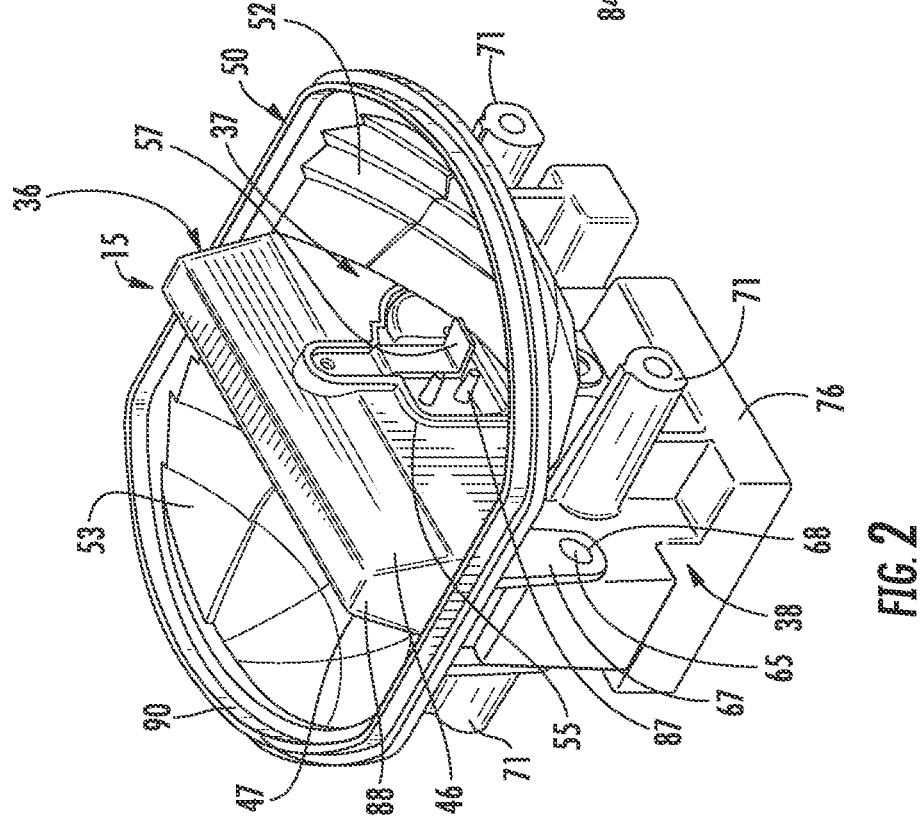

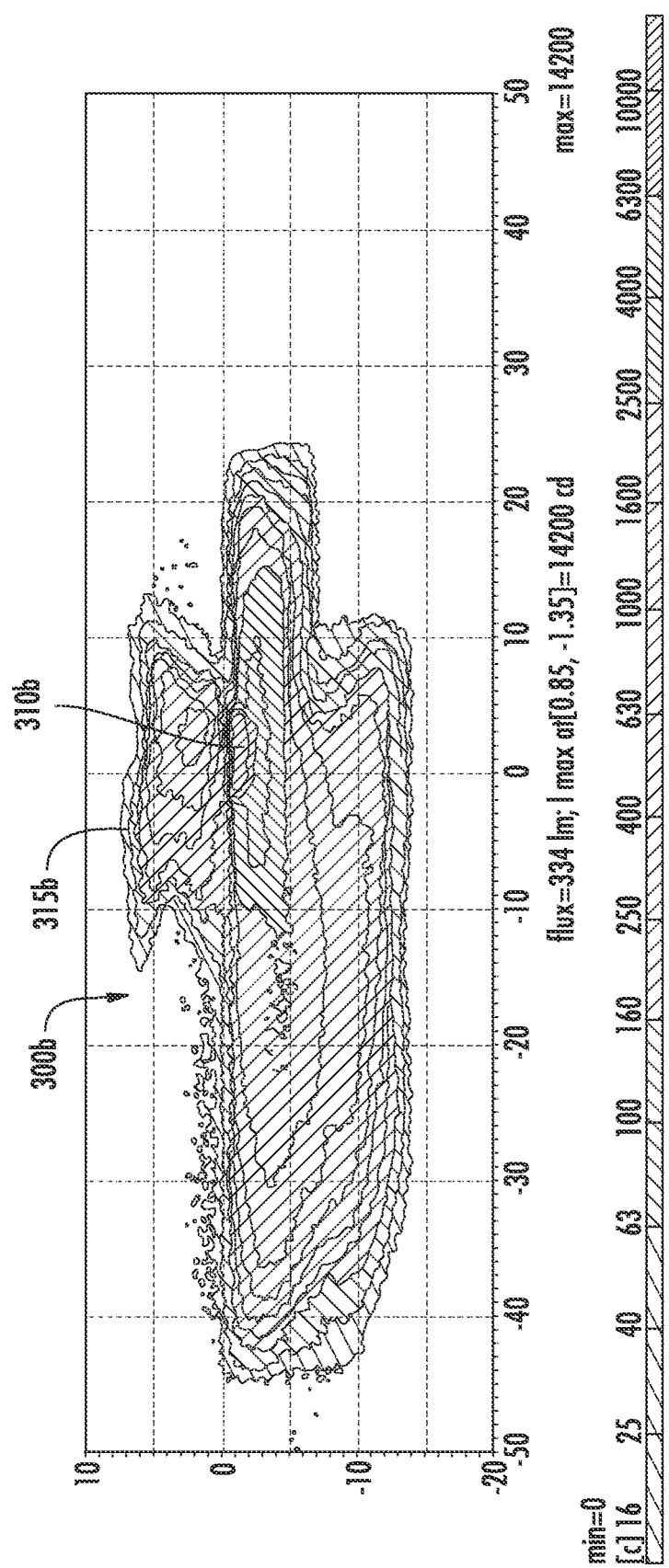

MODULAR HEADLAMP ASSEMBLY FOR PRODUCING A LIGHT DISTRIBUTION PATTERN

CROSS-REFERENCE TO RELATED APPLICATIONS

This application is a continuation-in-part of U.S. patent application Ser. No. 13/246,481 filed Sep. 27, 2011, which is incorporated herein by reference in its entirety.

BRIEF DESCRIPTION OF THE DRAWINGS

FIG. 1 is a front view of a modular headlamp assembly according to the present application.

FIG. 2 is a perspective view of a low beam headlamp module of the modular headlamp assembly.

FIG. 3 illustrates bottom view of the low headlamp beam module.

FIG. 12b illustrates a light distribution patterns generated by a left portion of the low beam module.

FIG. 13b illustrates a portion of a low beam light distribution pattern that results from a reflector segment of the reflector member of FIG. 13a.

FIG. 14b illustrates a portion of a low beam light distribution pattern that results from a reflector segment of the reflector member of FIG. 14a.

BRIEF SUMMARY

Figure 4:
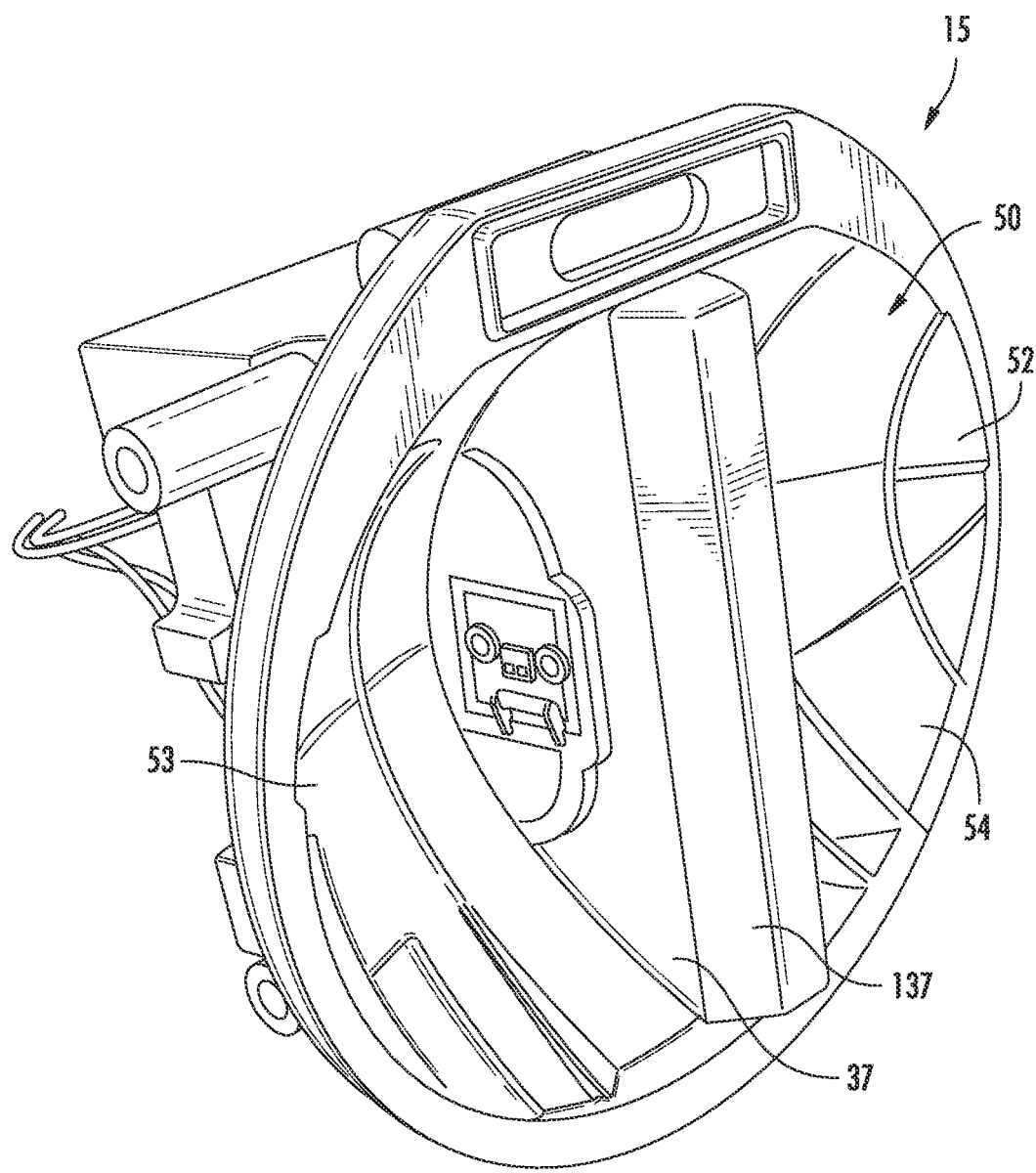
FIG. 4 illustrates an alternate embodiment of a low beam headlamp module.

A modular headlamp assembly includes low beam headlamp module for providing illumination in a predetermined light distribution pattern. The low beam headlamp module includes a low beam heat sink and mounting assembly having a low beam heat sink portion with first and second sides and a low beam mounting portion having alignment features formed therein. A low beam reflector member is attached to the low beam heat sink and mounting assembly such that the low beam heat sink portion bisects the reflector low beam member into first and second segments. The low beam reflector member includes mating features for engaging the alignment features formed on the low beam mounting portion to facilitate the alignment of the low beam reflector member to the low beam heat sink and mounting assembly.

A plurality of LED light sources is supported by the low beam heat sink portion. The reflector assembly and plurality of LED light sources produce a light distribution pattern extending at least 40 degrees in a first horizontal direction and at least 40 degrees in a second horizontal direction, with the light distribution pattern having a sharp horizontal cutoff line parallel to and below a horizon.

In particular, a first LED light source is supported by the first side of the low beam heat sink portion. The first segment of the low beam reflector member and first LED light source produce a portion of the light distribution pattern extending at least 40 degrees in a first horizontal direction and at least 20 degrees in a second horizontal direction. The light distribution pattern has a sharp horizontal cutoff line parallel to and below a horizon. A second LED light source is supported by a second side of the low beam heat sink portion. The second segment of the low beam reflector member and second LED light source produce a portion of the light distribution pattern extending at least 20 degrees in the first horizontal direction and at least 40 degrees in the second horizontal direction. The light distribution pattern has a sharp horizontal cutoff line parallel to and below a horizon and an up-lighting area extending about 6 degrees up and about 10 degrees in the first and second horizontal directions.

DETAILED DESCRIPTION

As illustrated in FIG. 1, a modular headlamp assembly is generally indicated at 10. Modular headlamp assembly 10 includes a low beam headlamp module 15 and a high beam headlamp module 20. A front turn/parking lamp module 22 having a reflector 23 and a bulb 24 is also included. Low beam headlamp module 15 and high beam headlamp module 20 and a side reflex reflector 26 are supported by a reflector carrier 30, which is adjustably fastened to a housing 35. A lens (not shown) is provided over housing 35 for light to pass through from low beam headlamp module 15, high beam headlamp module 20, and front turn/parking lamp module 22. Each component of modular headlamp assembly will now be described in detail.

FIG. 2 is a perspective view of low beam headlamp module 15 of modular headlamp assembly 10 including a heat sink and mounting assembly 36, which has a low beam heat sink portion 37 and a low beam mounting portion 38. Heat sink and mounting assembly 36 is formed from a thermally conductive material such as die cast aluminum, copper or magnesium. In addition, the heat sink and mounting assembly 36 is treated with a black thermally emissive coating to facilitate heat transfer through radiation. The coating may be an E-coat, an anodized coating, or a powder coat. In the embodiment shown, low beam heat sink portion 37 is oriented and bisects low beam headlamp module vertically in order to aid in thermal transfer. However, in other embodiments low beam heat sink portion 37 may be oriented horizontally such that it bisects low beam headlamp module 15 horizontally.

In general, low beam headlamp module 15 includes at least one low beam LED light source 40, which may be a 1×2 or a 1×4 Altilon LED Assembly manufactured by Philips Lumileds. Low beam LED light source 40 is mounted to low beam heat sink portion 37, having first and second sides 46 and 47, that extends through a low beam reflector member 50 such that low beam heat sink portion 37 bisects reflector member 50 into first and second segments 52 and 53. In the embodiment shown low beam LED light source 40 is oriented such that the axis of the light emitting die on the light source is arranged substantially parallel with the axis of emitted light. Alternatively, the axis of the light emitting diode on low beam LED light source 40 may be oriented substantially perpendicular to the axis of the emitted light.

At least one of first and second sides 46 and 47 of low beam heat sink portion 37 includes a light source-receiving portion 55 for containing low beam LED light source 40 and a light shield 57 positioned adjacent to low beam LED light source 40 for blocking a portion of the light in a low beam pattern. In particular, in the embodiment illustrated, light shield 57 blocks light from low beam LED light source 40 in the range of 10 U-90 U. With the illustrated light shield 57, the light intensity in the light pattern from 10 degrees UP to 90 degrees UP and 90 degrees LEFT to 90 degrees RIGHT will not exceed 125 candelas. The shape and location of light shield 57 may vary according to the shape and design of modular headlamp assembly 10. There are several factors that dictate the location and shape of the part, such as orientation of the LED die, reflector shape, and position within reflector. A thermally conductive compound is disposed between low beam heat sink portion 37 and low beam LED light source 40. Low beam mounting portion 38 includes alignment features 65 formed on stepped portions 66 that extend from mounting structure for facilitating the alignment of low beam reflector member 50 with low beam mounting portion 38. In particular, low beam reflector member 50 includes tabs 67 with apertures 68 formed therein for mating with alignment features 65 of low beam mounting portion 38.

FIG. 3 illustrates bottom view of low beam module 15. Low beam mounting portion 38 includes a base portion 70, which may be adapted to receive a driver circuit assembly (not shown). A plurality of mounting extensions 71 protrude from side edges 76 and 77 of base portion 70 adjacent to edges 78 and 79. In addition, channels 82 and 83 are formed within base portion 70 along edges 76 and 77 to accommodate electrical leads 84 and 85 from low beam LED light source 40.

FIG. 4 is an alternate embodiment of low beam module 15. Reflector member 50 is a complex reflector having a first segment 52, and a second segment 53. Reflector member 50 is a parabolic macro focal free form style reflector including a plurality of geometries or facets, one of which is indicated at 54, which facilitate production of the low beam light distribution patterns. In general, parabolic macro focal free form style reflectors allow sharp intensity cut-offs on both left and right sides of an aggregate beam pattern. The focal point of a macro focal free form reflector migrates around the LED emitter in order to direct a particular edge position on the emitter surface to a target, in order to produce sharp beam pattern cut-offs.

Reflector member 50 may comprise thermo set, thermo plastic material, or die-cast-type metal. Choice of materials is dependent upon such factors as whether a high-precision beam pattern is required, or where the headlamp must operate under higher than normal temperatures. Furthermore, reflectors made of die-cast metal provide the advantage of supplementing heat sinking within the device.

As discussed above, the majority of heat produced within low beam headlamp module is controlled via low beam heat sink portion 37. In addition, low beam heat sink portion 37, by virtue of its geometrical configuration, also affects the output of low beam headlamp module 15 with respect to beam pattern. Specifically, low beam heat sink portion 37 maybe formed with a chamfered edge 137 or other similar features that spread or block light. In particular, heat sink may include contours including chamfers, bevels, rounded edges, sharp edges, and the like to either block light or expand light emitted by an LED.

Figure 5:
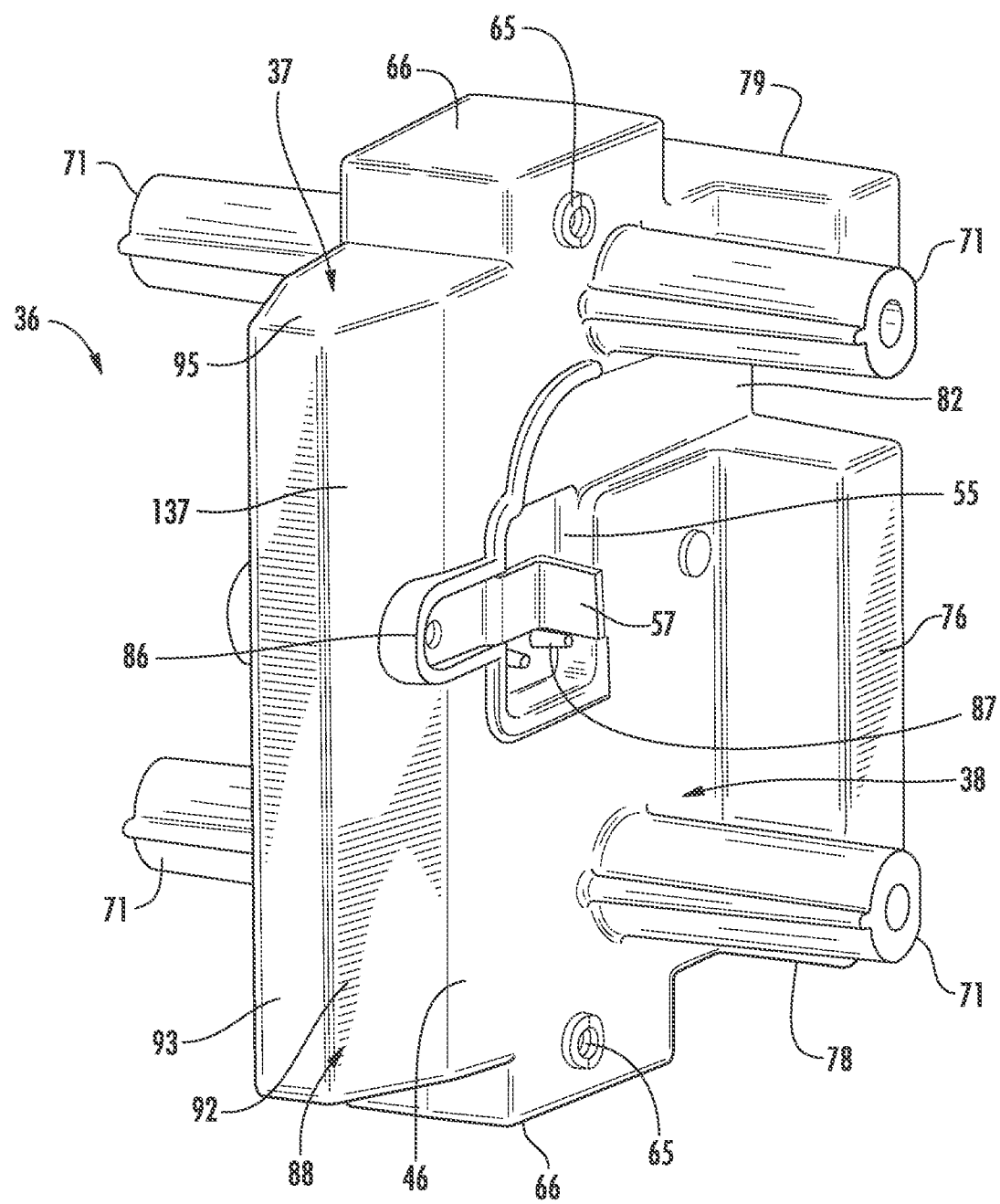
FIG. 5 illustrates a front perspective view of a heat sink and mounting assembly.

FIG. 5 illustrates a front perspective view of heat sink and mounting assembly 36. As discussed above heat sink and mounting assembly 36 includes integrally formed low beam heat sink portion 37 and low beam mounting portion 38. With reference to FIGS. 2-5, low beam heat sink portion 37 includes first and second sides 46 and 47, each of which includes a light source receiving portion 55 with an upper arch 86 for facilitating the attachment of light shield 57. Light source receiving portion 55 may take the form of an indented area sized to receive an LED light source. Alignment posts, 87, may be formed in light source receiving portion 55 for aligning with datum features in an LED light source to insure that the LED light source is accurately located on heat sink portion 37. In addition, light source receiving portion 55 may include holes (not shown) formed therein for accepting fasteners, used for securing the LED light source to heat sink portion 37.

An outwardly extending portion 88 of low beam heat sink portion 37 protrudes beyond a rim 90 of reflector 50, as shown in FIG. 2. Chamfered edge 137 is formed of outwardly extending portion 88 includes first and second slanted sides, one of which is indicated at 92, a top edge 93 and first and second ends 95. Stepped portions 66 of low beam mounting portion 38 are positioned adjacent to and extend laterally compared to ends 95 of outwardly extending portion 88 of low beam heat sink portion 37 such that, in an assembled configuration, stepped portions 66 of low beam mounting portion 38 are disposed behind reflector member 50.

Thus, it is the stepped portions 66 of low beam mounting portion 38 that facilitates the alignment of low beam reflector member 50 with low beam mounting portion 38. In particular, low beam reflector member 50 includes tabs 67 with apertures 68 formed therein for mating with alignment features 65 formed on stepped portions 66 of low beam mounting portion 38.

Figure 7:
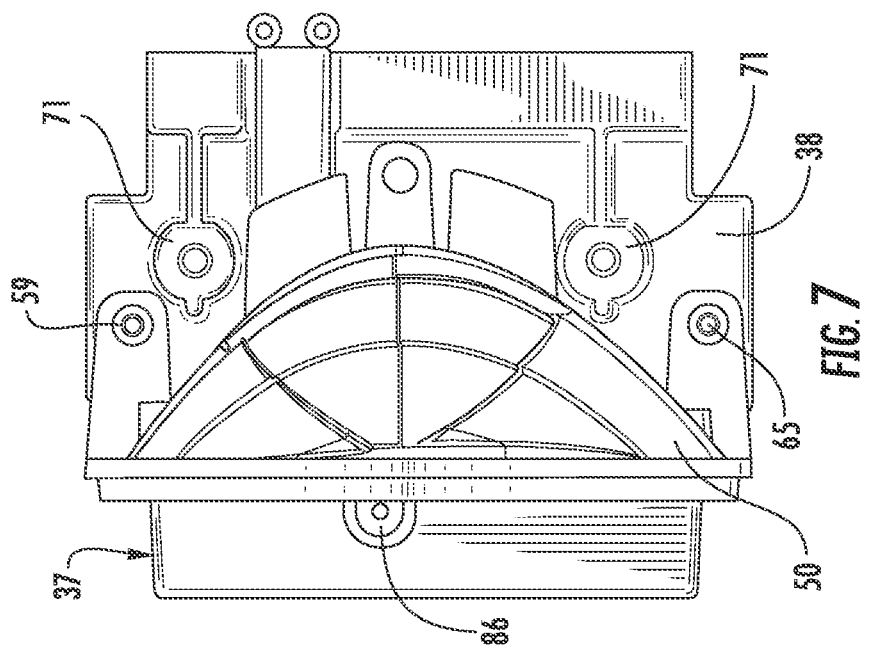
FIG. 7 is a side view of a low beam headlamp module.
Figure 6:
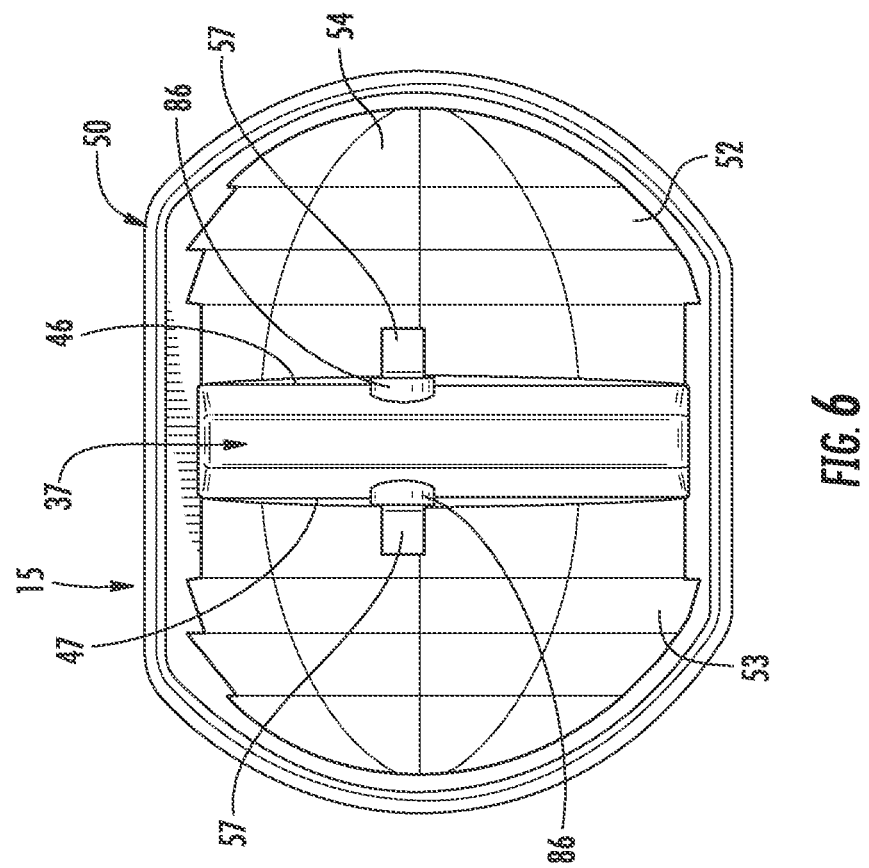
FIG. 6 is a front view of a low beam headlamp module.

FIG. 6 is a front view of low beam headlamp module 15 and FIG. 7 is a side view of low beam headlamp module 15. In particular, FIG. 6 illustrates reflector member 50 bisected into first and second segments 52 and 53 by low beam heat sink portion 37. Each of first and second sides 46 and 47 of heat sink portion 37 is shown with an upper arch 86 of light source receiving portion 55 and light shield 57. Light shield is a steel component; however, a thermoplastic material, such as glass-filled nylon, could also be used. Alternatively, light shield 57 may be mounted to a BUSS bar rather than directly to low beam heat sink portion 37.

Reflector member 50, in the embodiment shown, is a single component with reflective portions on both sides of low beam heat sink portion 37. Alternatively, reflector member 50 may be composed of multiple separate and distinct reflector components individually mounted on either side of low beam heat sink portion 37. Reflector member 50 is formed of a thermoplastic or thermoset vacuum metalized material. For example, reflector member 50 may be formed of ULTEM, polycarbonate, or a bulk-molding compound. First and second segments 52 and 53 of reflector member 50 have a complex reflector optic design. The complex reflector optical design includes multiple intersecting segments or facets 54. The segments intersect at points that may be profound and visible or blended to form a uniform single surface.

Figure 8:
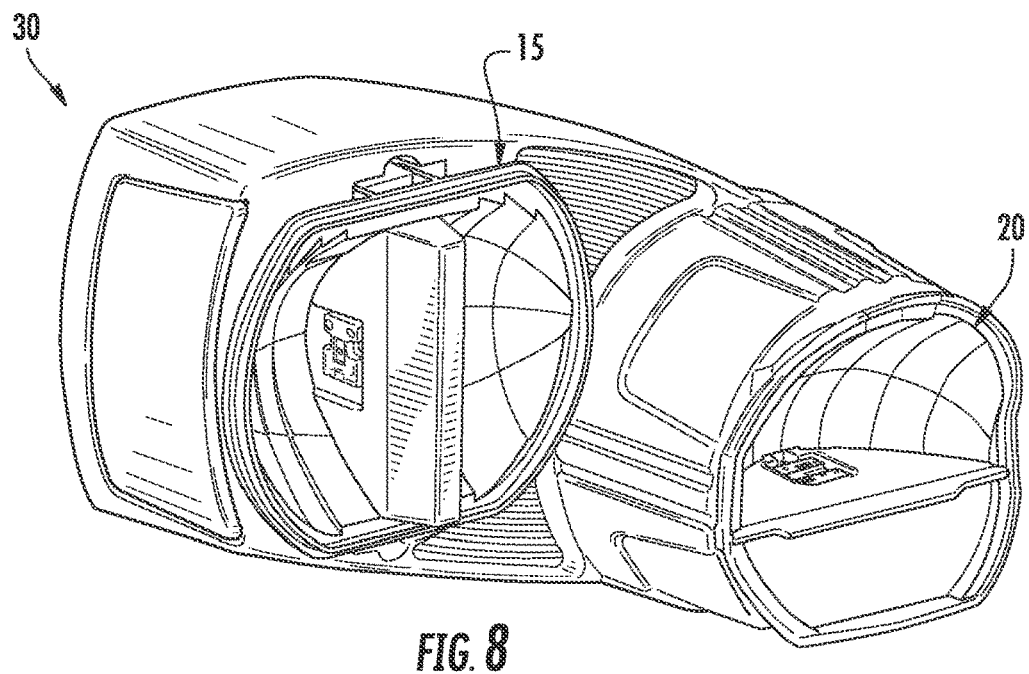
FIG. 8 illustrates a front perspective view of the reflector carrier with high and low beam modules in an installed position.
Figure 9:
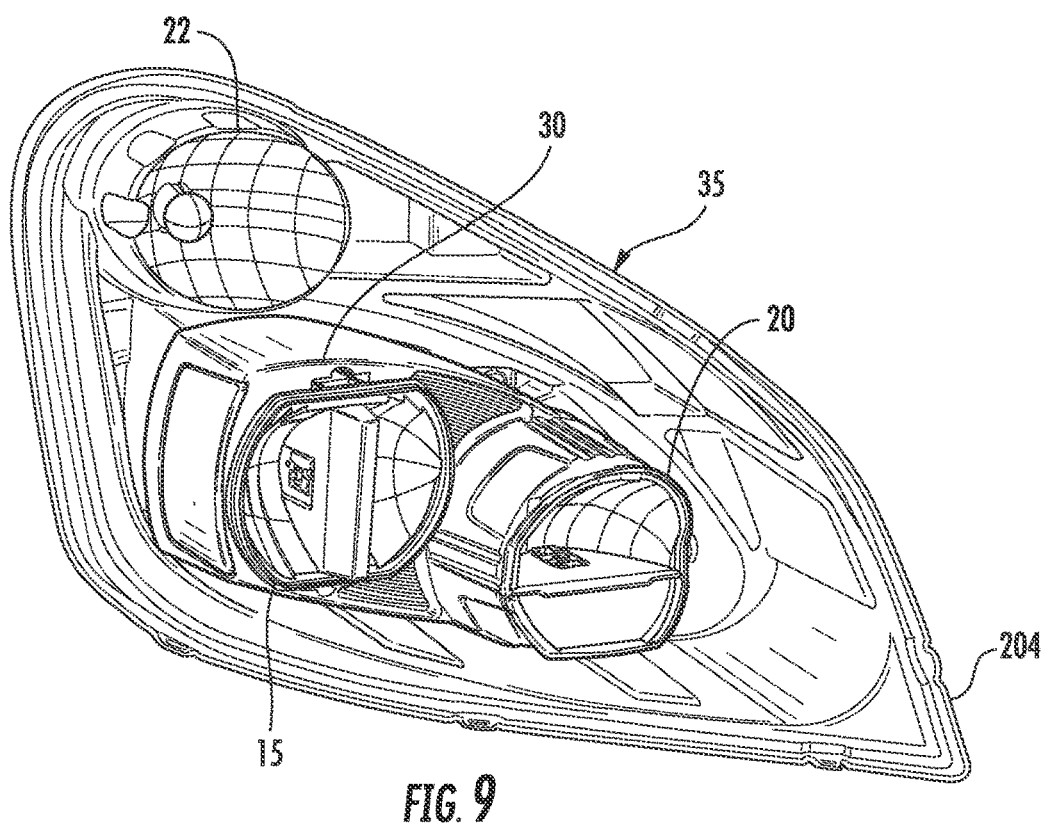
FIG. 9 illustrates a front perspective view of the modular headlamp assembly.

FIG. 8 illustrates reflector carrier 30 with high and low beam modules 15 and 20 in an installed position and FIG. 9 is a front perspective view of housing 35 with reflector carrier 30 and turn/parking lamp module 22 installed. A lens (not shown) is positioned over modular headlamp assembly for connection to housing 35 at rim 204.

Figure 10:
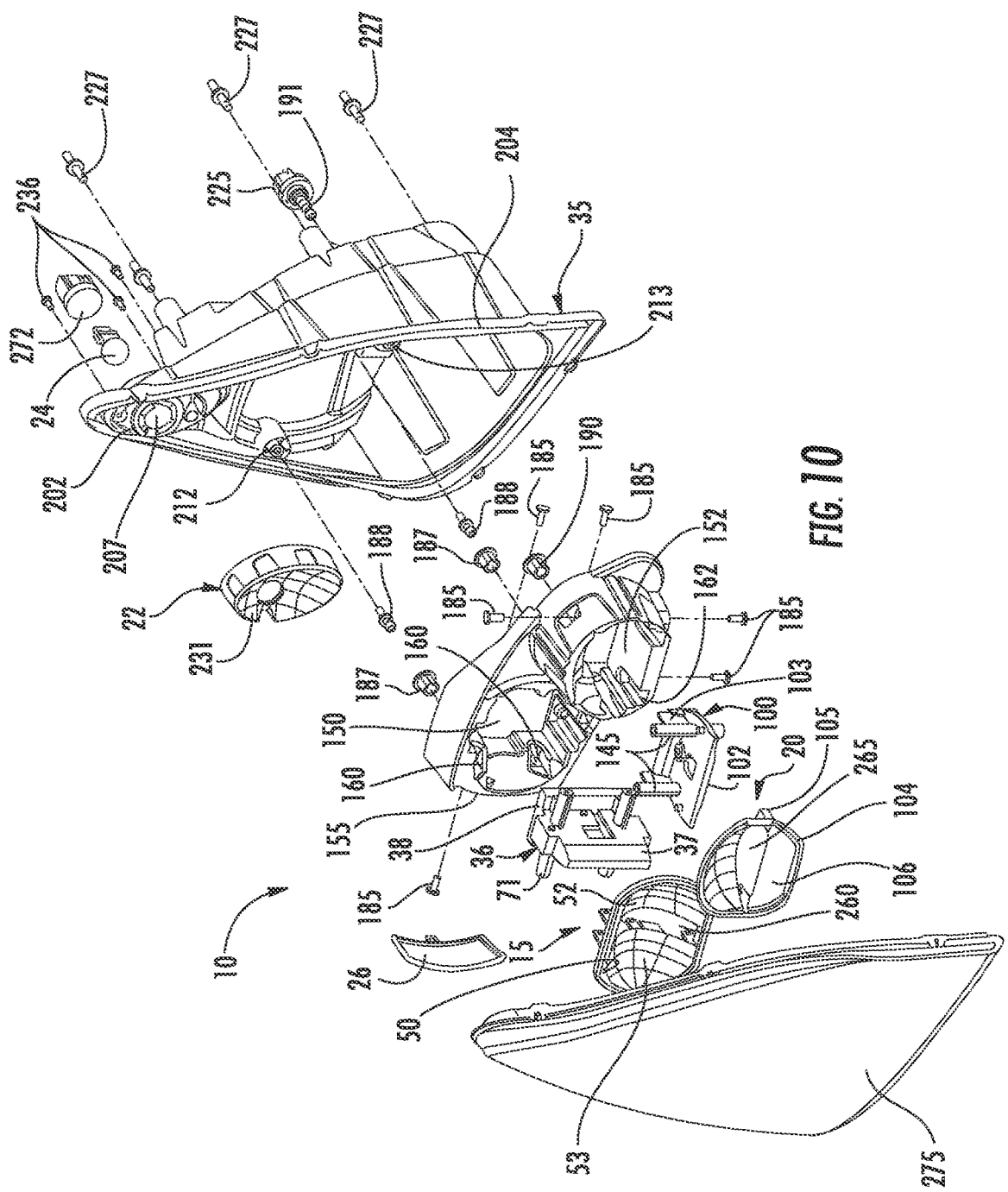
FIG. 10 is an exploded view of the modular headlamp assembly.

FIG. 10 is an exploded view of modular headlamp assembly 10 for illustrating the manner in which low beam headlamp module 15, high beam headlamp module 20, reflector carrier 30 and housing 35 are assembled. As discussed above, low beam headlamp module 20 includes low beam reflector member 50 and heat sink and mounting assembly 36 with low beam heat sink portion 37 and low beam mounting portion 38. Low beam heat sink portion 37 extends through a gap 260 formed between first and second reflector segments 52 and 53, such that low beam heat sink portion 37 bisects reflector member 50.

Similarly, high beam headlamp module 20 includes a high beam heat sink and mounting assembly 100 having a high beam heat sink portion 102 and a high beam mounting portion 103. High beam reflector member 104 includes an upper reflective portion 105 and a lower portion 106 with a gap 265 formed therebetween. In an assembled position, high beam heat sink portion 102 extends through gap 256, such that upper reflective portion 105 and a lower portion 106 are separated by high beam heat sink portion 102. Low beam headlamp module 15 fits within first receiving pocket 150 of reflector carrier 30 and high beam headlamp module 20 fits within second receiving pocket 152 of reflector carrier 30. Mounting extensions 71 of low beam module 15 are received within recesses 160 formed within first receiving pocket 150. Similarly, mounting extensions 145 of high beam module 20 are received within recesses 162 formed within second receiving pocket 152 such that high beam module 20 is properly aligned within reflector carrier 30. Fasteners, such as screws 185, are used to secure low beam headlamp module 15 and high beam headlamp module 20 to reflector carrier 30. Side reflex reflector 26 is also attached to reflector carrier 30 at receiving slot 155.

Reflector carrier 30 is attached to housing 35 by way of sockets 187 and 190, along with pivot studs 188 and reflector carrier adjuster pivot stud 191. Pivot studs 188 are coupled to attachment points 212 to facilitate attachment of reflector carrier 30 to housing 35. In addition, reflector carrier adjuster pivot stud 191 attaches to socket 190 through cam opening 213. Adjuster pivot stud 191 is accessible from behind modular headlamp assembly 10 by way of gear box assembly 225. In the embodiment shown, turning gear box assembly 225 clockwise lengthens or shortens the adjuster pivot stud, thereby adjusting the vertical aim of reflector carrier 30. Adjustment of the vertical aim allows for visual aiming of the modular headlamp assembly 10. The beam pattern is projected onto a flat screen or wall and the vertical aim of the pattern is adjusted until the horizontal cut-off in the beam pattern is aligned with the horizontal reference line on the screen. Adjuster pivot stud 191 is turned until the horizontal cut-off in the pattern is deemed to align with the horizontal reference line on a screen. Vehicle mounting studs 227 to facilitate attachment of modular headlamp assembly 10 to a vehicle.

Turn/parking lamp module 22 installed within front turn/parking lamp receiving area 202 of housing 35. In particular, front turn/parking lamp bulb 24 is secured to housing 30 through cam feature 207 and reflector 231 is secured to housing 35 with fasteners 236. Front turn/parking lamp bulb 24 is secured to housing 30 through cam feature 207. A socket assembly 272 is also included to secure front turn/parking lamp module 22 to housing 35. A lens 275 is positioned over modular headlamp assembly 10 for connection to housing 35 at rim 204.

Figure 11:
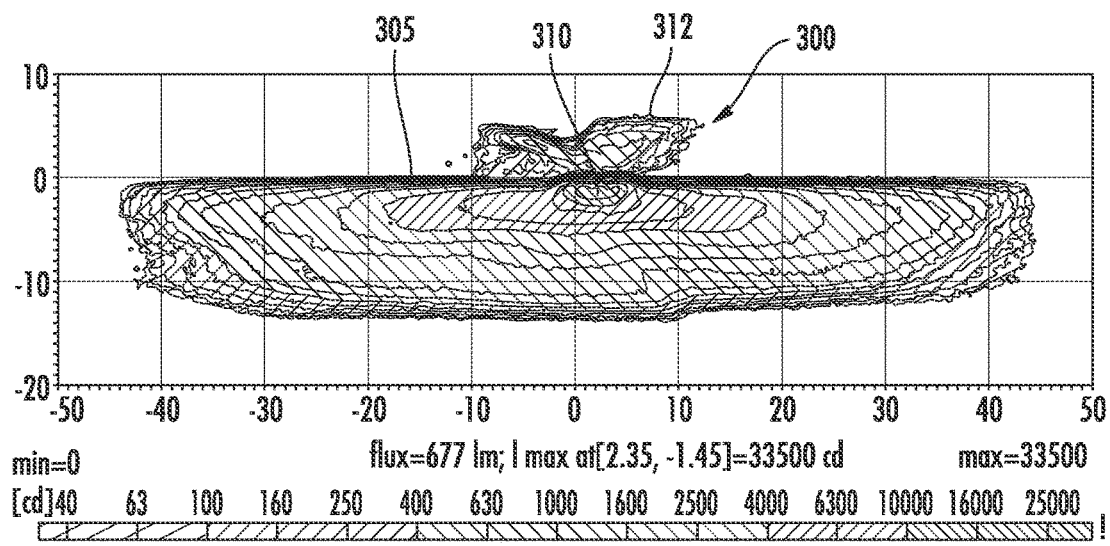
FIG. 11 illustrates a low-beam light distribution pattern.

Low beam headlamp module 15 is configured to produce a predetermined low-beam light distribution pattern 300, as illustrated in FIG. 11. In general, headlamp beam patterns comprise spread light, which illuminates a relatively large portion of the beam pattern at relatively even illumination levels, and hot spots, which are relatively small areas of increased illumination levels. Beam patterns must be carefully designed and configured to ensure that both the area and illumination levels of the spread illumination and the area and the illumination levels of the hot spots are within acceptable regulatory limits. As illustrated in FIG. 11, low-beam light distribution pattern 300 has a sharp horizontal cutoff line 305 that is parallel to a horizon, which is indicated by horizontal zero. Horizontal cutoff line 305 is aimed to 0.6 degrees down. The horizontal spread of light distribution pattern 300 is about 40 degrees in a left or first direction and about 40 degrees in a right or second direction. In the embodiment show, the horizontal spread is 44 degrees in the left and right directions. The vertical spread of light distribution pattern 300 is from 0.6 degrees down to about 14 degrees down. Light distribution pattern 300 is smooth and includes only one highly illuminated hot zone 310. Hot zone 310 is defined by zero degrees in a first horizontal direction, about ten degrees in a second horizontal direction, about zero degrees in a first vertical direction, and about three degrees in a second horizontal direction. In the embodiment illustrated, hot zone 310 is surrounded by vertical zero, horizontal zero, eight degrees right, and three degrees down. In addition, an up lighting area 312 exists between horizontal zero, six degrees up, and ten degrees to the left and right. Light distribution pattern 300 results from the light distribution of both first and second segments 52, 53 of reflector member 50.

Figure 12A:
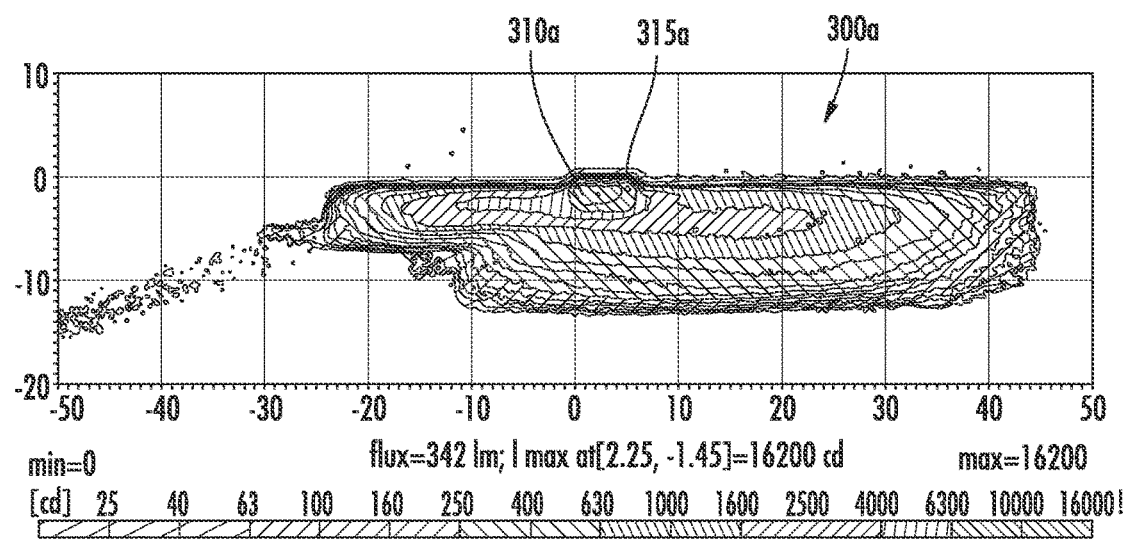
FIG. 12a illustrates a light distribution patterns generated by a right portion of the low beam module.

FIGS. 12a and 12b illustrate light distribution patterns generated by right and left portions of low beam module 15, respectively. Right portion (first segment 52) of reflector member 50 contributes to light distribution pattern 300a, as illustrated by FIG. 12a, which extends at least 40 degrees in a first horizontal direction and at least 20 degrees in a second horizontal direction. Light distribution pattern 300a has a sharp horizontal cutoff line parallel to and below a horizon. In the embodiment shown in FIG. 12a, the horizontal spread of light distribution pattern 300a is 44 degrees in the right direction and 22 degrees to the left. The vertical spread of light distribution pattern 300a is from 0.6 degrees down to about 14 degrees down. A hot zone 310a is surrounded by vertical zero, horizontal zero, eight degrees right, and three degrees down. A kink pattern 315a is present above hot zone 310a and extends about 1 degree up.

Left portion (first segment 53) of reflector member 50 contributes to light distribution pattern 300b, as illustrated by FIG. 12b, which extends at least 20 degrees in the first horizontal direction and at least 40 degrees in the second horizontal direction. Light distribution pattern 300b has a sharp horizontal cutoff line parallel to and below a horizon. In the embodiment shown in FIG. 12b, the horizontal spread of light distribution pattern 300b is 22 degrees in the right direction and 44 degrees to the left. The vertical spread of light distribution pattern 300b is from 0.6 degrees down to about 14 degrees down. A hot zone 310b is surrounded by vertical zero, horizontal zero, eight degrees right, and three degrees down. A kink pattern 315b is present above hot zone 310b and extends about 1 degree up. In addition, an up lighting area exists between horizontal zero, six degrees up, and 14 degrees to the left and right.

Figure 13A:
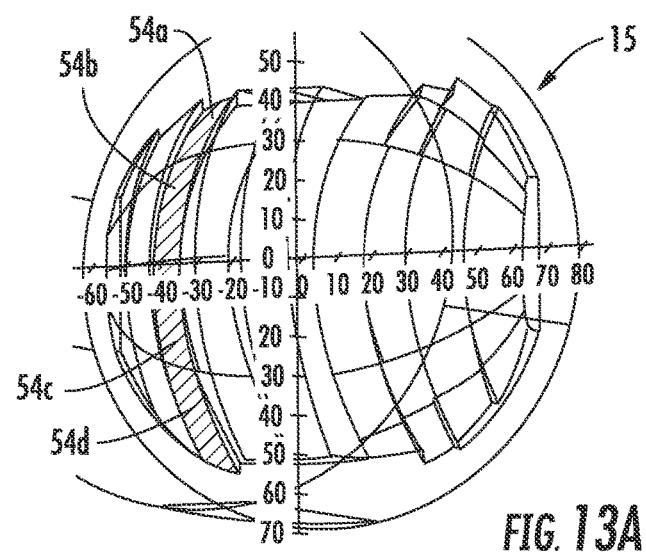
FIG. 13a illustrates one embodiment of a reflector member.
Figure 13B:
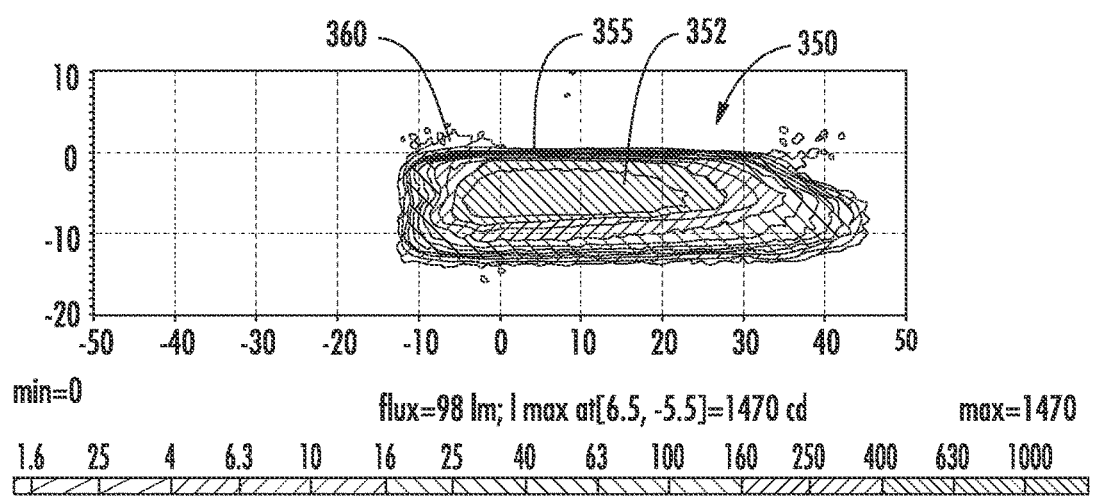

FIG. 13a illustrates one embodiment of reflector member 15. FIG. 13b illustrates a portion 350 of the low beam light distribution pattern that results from reflector segments 54a-54d. The software utilized to create the disclosed macro focal free form reflector (LucidShape™) is manufactured by Brandenburg gmbh. As discussed above, a macro focal free form reflector design enables the focal point of the reflector to move about the emitter surface by virtue of multiple sets of focal points rather than one fixed focal point characteristic of conventional reflectors. Thus, the more "complex" the reflector's surface is, the more complex is the resultant beam pattern. FIG. 13c illustrates portion 350 of light distribution pattern that results from segments 54a-54d. Light distribution pattern portion 350 includes hot spot 352, cut-off line 355, and elbow/kink 360.

Figure 14A:
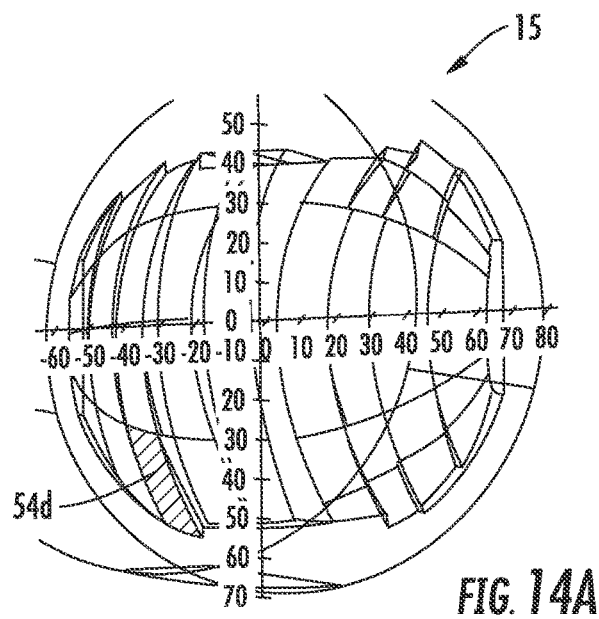
FIG. 14a illustrates an embodiment of a reflector member.
Figure 14B:
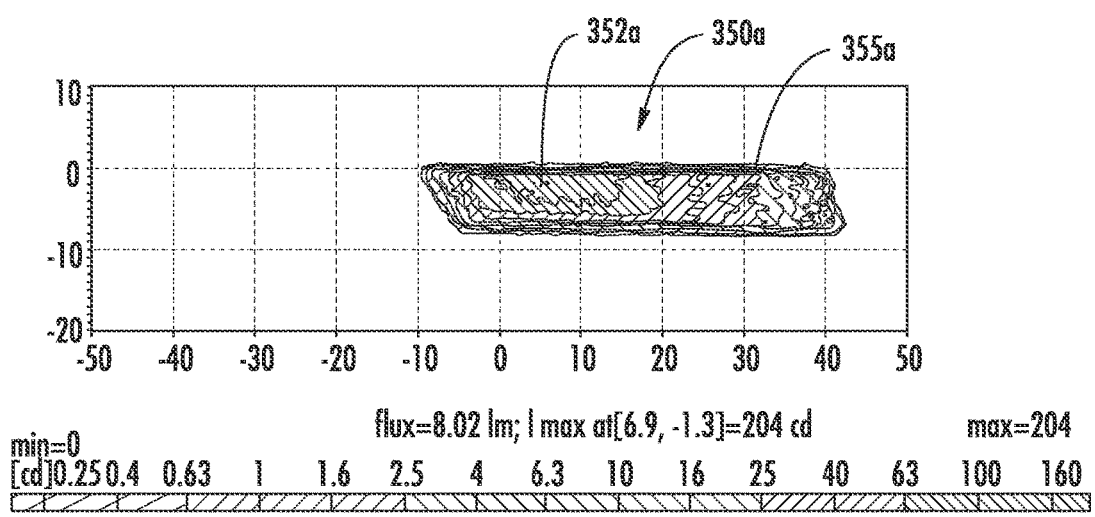

FIG. 14a illustrates reflector member 15 with segment 54d. FIG. 14b illustrates a portion 350a of the low beam light distribution pattern that results from reflector segment 54d only. Light distribution pattern portion 350s includes hot spot 352a and cut-off line 355a. In general, the quantity of segments or facets as well as the dimension of each facet influences the shape of the resultant light distribution pattern. Thus, the resultant beam pattern 350a comprising a focal point made up of one reflector segment 54d as shown in FIG. 14b, is more rectangular in shape as compared to the pattern 350 shown in FIG. 13b, which exemplifies an asymmetrical geometry resulting from reflector segments 54a-54d. This asymmetry is what enables sharp cut-offs such as cut-off 355; thus, creating a light distribution pattern that meets regulations, including ECE 112, having the objective of minimizing headlamp glare to oncoming vehicle traffic. In addition, as can be seen from a comparison of FIGS. 13b and 14b, a focal point comprising more than one reflector segment also enables greater gradation in the light distribution pattern's intensity. Specifically, hot spot 352 shown in FIG. 13b has many more horizontal gradations as compared to the pattern shown in FIG. 14b.

Figure 15:
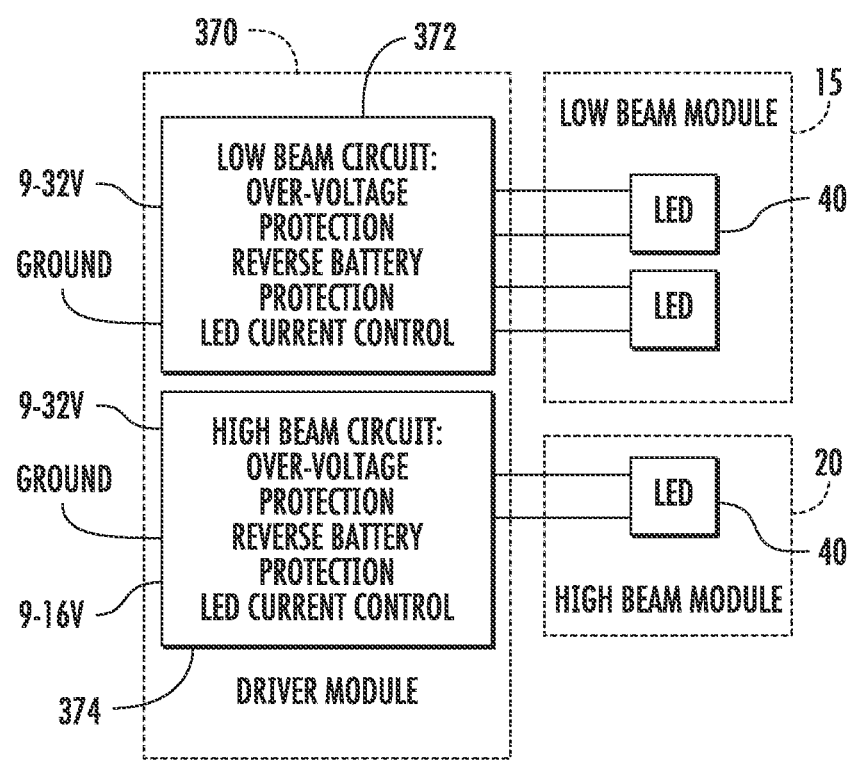
FIG. 15 is a block diagram of an exemplary driver circuit for use with the modular headlamp assembly.

FIG. 15 is a block diagram of an exemplary driver circuit for use with modular headlamp assembly 10. Proper functioning of LEDs requires a constant current output. Thus, current regulators may be necessary to convert power originating from a vehicle battery. In addition, LEDs must be protected from transient voltages. Thus, modular headlamp assembly 10 is used with driver circuitry similar to that shown in the block diagram of FIG. 4. Specifically, FIG. 4 illustrates low beam module 15 having two LED light sources, one of which is indicated at 40. High beam module 20 includes LED 40. Both low beam module 15 and high beam module 20 are electrically connected to driver module 370, which includes a low beam driver circuit 372 and a high beam driver circuit 374. Each driver circuit 372 and 374 includes circuitry that provides over-voltage protection, reverse battery protection, and constant current output to LEDs 40.

Figure 16A:
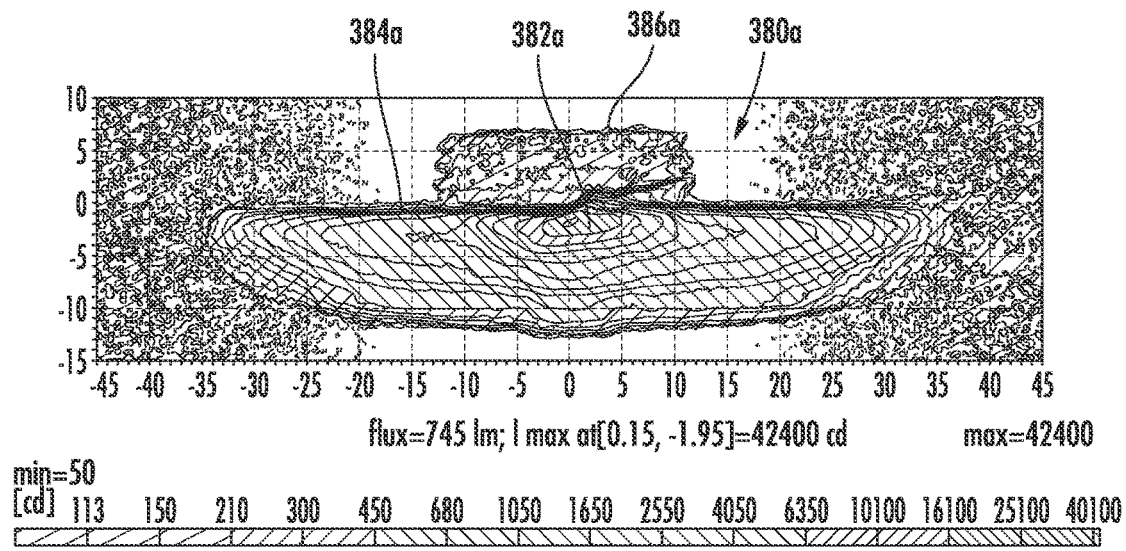
FIG. 16a illustrates a light distribution pattern for a right-hand traffic asymmetrical passing beams (low beams) in accordance with ECE R112.
Figure 16B:
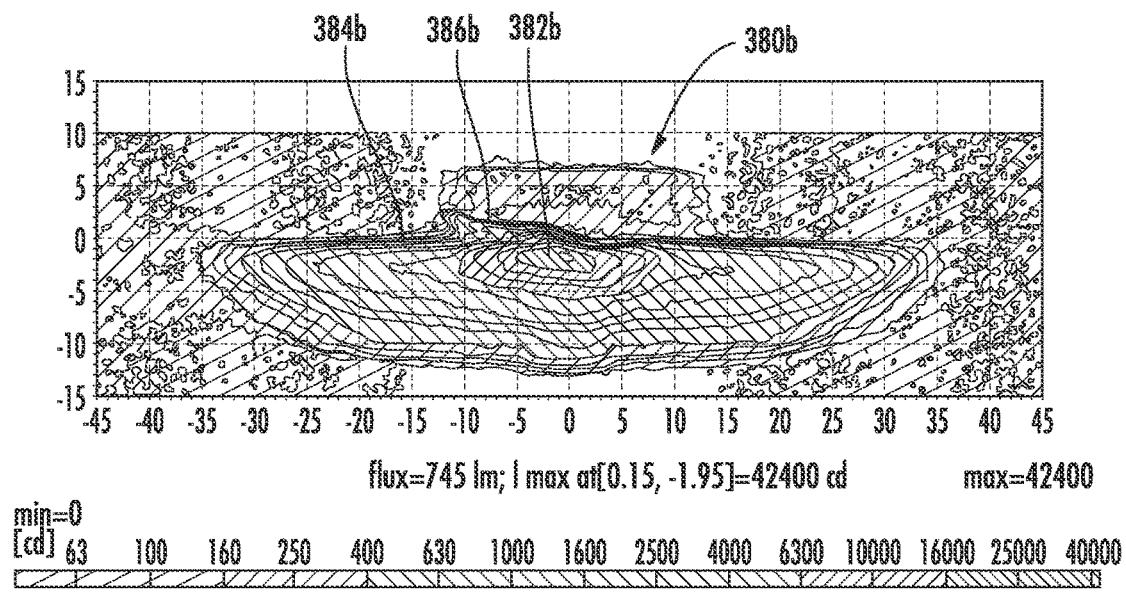
FIG. 16b illustrates a light distribution pattern for a left-hand traffic asymmetrical passing beams (low beams) in accordance with ECE R112.

Low beam module 15 may also be configured to produce a light distribution pattern that conforms to European Commission on Economics (ECE) Regulations. FIGS. 16a and 16b illustrate right-hand and left-hand low beam light distribution patterns 380a and 380b in accordance with Right Hand Traffic ECE R112 and Left Hand Traffic ECE R112. Each low beam pattern has a horizontal spread ranging from about 44 to −44 degrees and a vertical spread ranging from about 0.6 to −15 degrees. The European Commission on Economics (ECE) Regulation 112 specifies characteristics of headlamp beam patterns with respect to intensity, coordinates, and contour. Specifically, FIG. 16a illustrates light distribution pattern 380a having hot spot 382a, a cut-off 384a, and an elbow or "kink" 386a extending upward to about 3 degrees and horizontally from about zero to ten degrees. Cut-off 384a represents a regulatory limitation on the vertical extent of the beam in order to prevent blinding/dazzling of oncoming vehicles. Hot spot 382a represents an area in the pattern of highest intensity. With respect to right-hand light distribution pattern 380a, hot spot 382a is located horizontally between about minus three degrees and five degrees and vertically between about horizontal zero and minus three.

FIG. 16b illustrates left-hand light distribution pattern 380b having hot spot 382b, a cut-off 384b, and an elbow or "kink" 386b extending upward to about 3 degrees and horizontally from about zero to minus ten degrees. With respect to left-hand light distribution pattern 380b, hot spot 382b is located horizontally between about minus five degrees and three degrees and vertically between about horizontal zero and minus three.

While description has been made in connection with embodiments and examples of the present invention, those skilled in the art will understand that various changes and modification may be made therein without departing from the present invention. It is aimed, therefore to cover in the appended claims all such changes and modifications falling within the true spirit and scope of the present invention.

We claim:

1. A low beam headlamp module for providing illumination in a predetermined light distribution pattern, said low beam headlamp module including:

a unitary low beam heat sink and mounting assembly having a low beam heat sink portion with first and second sides and a low beam mounting portion having alignment features formed therein, wherein the first side and the second side terminate at an edge portion;

a unitary low beam reflector member, having a rim, attached to the low beam heat sink and mounting assembly such that the low beam heat sink portion separates the low beam reflector member into first and second sections, said low beam reflector member including mating features for engaging the alignment features formed on the low beam mounting portion to facilitate the alignment of the low beam reflector member to the low beam heat sink and mounting assembly, the unitary reflector member having a plurality of asymmetric facets, wherein the edge portion protrudes beyond the rim of the unitary low beam reflector member;

a first LED light source supported by said first side of the low beam heat sink portion, said first section of the low beam reflector member and first LED light source producing a first portion of the light distribution pattern extending at least 40 degrees in a first horizontal direction and at least 20 degrees in a second horizontal direction, said light distribution pattern having a sharp horizontal cutoff line parallel to and below a horizon at horizontal zero;

and a second LED light source supported by said second side of the low beam heat sink portion, said second section of the low beam reflector member and second LED light source producing a second portion of the light distribution pattern extending at least 20 degrees in said first horizontal direction and at least 40 degrees in said second horizontal direction, said light distribution pattern having a sharp horizontal cutoff line parallel to and below a horizon at horizontal zero and an up-lighting area extending about 6 degrees up and about 10 degrees in first and second horizontal directions, wherein the light distribution pattern results from both the first portion and the second portion.

2. The low beam headlamp module of claim 1, further comprising:
a first light shield positioned adjacent to the first LED light source for blocking a portion of the light distribution pattern, and
a second light shield positioned adjacent to the second LED light source for blocking a portion of the light distribution pattern.

3. The low beam headlamp module of claim 2 wherein the first and second light shields block light from the first and second LED light sources in a 10U-90U range.

4. The low beam headlamp module of claim 1 wherein the low beam heat sink portion is oriented and separates said unitary low beam reflector member vertically.

5. A modular vehicle headlamp for providing illumination in a predetermined light distribution pattern, said vehicle headlamp comprising: a low beam headlamp module including: a low beam reflector member including a first low beam reflector section and a second low beam reflector section, each of said first low beam reflector section and said second low beam reflector section having a plurality of asymmetric facets; a low beam heat sink and mounting assembly having a heat sink portion with first and second sides, said heat sink portion positioned between and separating said low beam reflector member into said first low beam reflector section and said second low beam reflector section; a plurality of LED light sources supported by the heat sink portion, said low beam reflector member and said plurality of LED light sources producing a light distribution pattern extending at least 40 degrees in a first horizontal direction and at least 40 degrees in a second horizontal direction, said light distribution pattern having a sharp horizontal cutoff line parallel to and below a horizon, wherein the light distribution pattern results from both of said first low beam reflector section and said second low beam reflector section; and a high beam headlamp module including: a high beam heat sink and mounting assembly including a high beam heat sink portion having first and second sides, said first side supporting at least one high beam LED light source; and a high beam reflector member including an upper reflective portion and a lower portion, which are separated by the high beam heat sink portion, wherein the low beam module is positioned adjacent to the high beam module, wherein the low beam heat sink portion is oriented in a first plane and the high beam heat sink portion is oriented in a second plane that is perpendicular to the first plane, and wherein the low beam reflector member has rim and the heat sink includes an edge portion that protrudes beyond the rim of the low beam reflector member.

6. The vehicle headlamp according to claim 5, wherein the light distribution pattern further includes a hot zone defined by zero degrees in a first horizontal direction, about ten degrees in a second horizontal direction, about zero degrees in a first vertical direction, and about three degrees in a second vertical direction.

7. The vehicle headlamp according to claim 6, wherein the first low beam reflector section and a first LED light source produce a portion of the light distribution pattern extending at least 40 degrees in a first horizontal direction and at least 20 degrees in a second horizontal direction, said light distribution pattern having a sharp horizontal cutoff line parallel to and below a horizon.

8. The vehicle headlamp according to claim 7, wherein a second LED light source is supported by said second side of the heat sink portion, said second low beam reflector section and second LED light source producing a portion of the light distribution pattern extending at least 20 degrees in said first horizontal direction and at least 40 degrees in said second horizontal direction, said light distribution pattern having a sharp horizontal cutoff line parallel to and below a horizon and an up-lighting area extending about 6 degrees up and about 10 degrees in the first and second horizontal directions.

9. The vehicle headlamp according to claim 5, wherein the low beam reflector member is a unitary piece having an opening formed therein for receiving the low beam heat sink portion.

10. A modular high and low beam headlamp assembly with a housing, said headlamp assembly comprising: a low beam headlamp module including: a low beam heat sink and mounting assembly having a low beam heat sink portion with first and second sides and a low beam mounting portion having alignment features formed therein; a low beam reflector member attached to the low beam heat sink and mounting assembly such that the low beam heat sink portion separates the low beam reflector member into first and second sections, said low beam reflector member including mating features for engaging the alignment features formed on the low beam mounting portion to facilitate the alignment of the low beam reflector member to the low beam heat sink and mounting assembly, wherein each of first and second sections of the reflector member have a plurality of facets; a first LED light source supported by said first side of the low beam heat sink portion, said first section of the low beam reflector member and first LED light source producing a first portion of a light distribution pattern extending at least 40 degrees in a first horizontal direction and at least 20 degrees in a second horizontal direction, said light distribution pattern having a sharp horizontal cutoff line parallel to and below a horizon at horizontal zero; and a second LED light source supported by said second side of the low beam heat sink portion, said second section of the low beam reflector member and second LED light source producing a second portion of a light distribution pattern extending at least 20 degrees in said first horizontal direction and at least 40 degrees in said second horizontal direction, said light distribution pattern having a sharp horizontal cutoff line parallel to and below a horizon at horizontal zero and an up-lighting area extending about 6 degrees up and about 10 degrees in the first and second horizontal directions; wherein an aggregate beam pattern is a combination of the first and the second portions of the light distribution patterns; a high beam headlamp module including: at least one high beam LED light source; a high beam heat sink and mounting assembly including a high beam heat sink portion having first and second sides, said first side supporting the at least one high beam LED light source and a high beam mounting portion, and a high beam mounting portion having alignment features formed therein; and a high beam reflector member including an upper reflective portion and a lower portion, which are separated by the high beam heat sink portion, said high beam reflector member including mating features for engaging the alignment features formed on the high beam mounting portion to facilitate the alignment of the high beam reflector member with the high beam heat sink and mounting assembly; wherein the low beam headlamp module is positioned adjacent the high beam headlamp module and wherein the low beam heat sink portion is oriented in a first plane and the high beam heat sink portion is oriented in a second plane that is perpendicular to the first plane and wherein the low beam reflector member has rim and the heat sink includes an edge portion that protrudes beyond the rim of the low beam reflector member.

11. The headlamp assembly of claim 10 wherein the low beam heat sink and mounting assembly and the high beam heat sink and mounting assembly are formed from a thermally conductive material.

12. The headlamp assembly of claim 11 wherein the low beam heat sink and mounting assembly and the high beam heat sink and mounting assembly are formed from a material in the group consisting of aluminum, copper and magnesium.

13. The headlamp assembly of claim 11 wherein the low beam heat sink and mounting assembly and the high beam heat sink and mounting assembly are treated with a thermally emissive coating to facilitate heat transfer through radiation.

14. The headlamp assembly of claim 13 wherein the thermally emissive coating is an E-coat, an anodized coating, or a powder coat.

15. The headlamp assembly claim 11 wherein the low beam heat sink portion is oriented vertically such that it separates the low beam headlamp module vertically.

16. The headlamp assembly of claim 15 wherein the high beam heat sink portion is oriented horizontally such that it separates the high beam headlamp module horizontally.

17. The headlamp assembly of claim 10, further comprising:
a light shield positioned adjacent to the first LED light source for blocking a portion of the light distribution pattern, and
a second light shield positioned adjacent to the second LED light source for blocking a portion of the light distribution pattern.

18. The headlamp assembly of claim 10 further including first and second light shields, wherein said first and second light shields block light from the first and second LED light sources in a 10U-90U range.

19. The headlamp assembly of to claim 10, wherein the light distribution pattern further includes a hot zone defined by zero degrees in a first horizontal direction, about ten degrees in a second horizontal direction, about zero degrees in a first vertical direction, and about three degrees in a second vertical direction.

20. The headlamp assembly of claim 10, further comprising:
a reflector carrier including:
a first receiving pocket for the low beam headlamp module, the first receiving pocket having recesses formed therein for accepting mounting extensions of the low beam headlamp module such that said low beam headlamp module is aligned within said reflector carrier;
a second receiving pocket for the high beam headlamp module, the second receiving pocket having recesses formed therein for accepting mounting extensions of the high beam headlamp module such that said high beam headlamp module is aligned within said reflector carrier;
a receiving slot for a side reflex reflector; and
a plurality of attachment features formed within a back side of the reflector carrier, wherein at least one of said plurality of attachment features is for facilitating adjustable attachment of the reflector carrier to the housing.

21. The headlamp assembly of claim 10, wherein the low beam reflector member is a unitary piece having an opening formed therein for receiving the low beam heat sink portion.

* * * * *